INVENTOR.
HAROLD K. THOMPSON
BY
ATTORNEY

Sept. 1, 1964     H. K. THOMPSON     3,146,596
NON-COMPLEMENTARY CAMS FOR DOUBLE ACTING FLUID MOTOR
Filed Oct. 19, 1960     4 Sheets-Sheet 2

*INVENTOR.*
HAROLD K. THOMPSON
BY
*Ralph L. Tweedale*
ATTORNEY

United States Patent Office 3,146,596
Patented Sept. 1, 1964

3,146,596
NON-COMPLEMENTARY CAMS FOR DOUBLE
ACTING FLUID MOTOR
Harold K. Thompson, Ferndale, Mich., assignor to The
Thompson Company, Ferndale, Mich., a co-partnership
Filed Oct. 19, 1960, Ser. No. 63,556
1 Claim. (Cl. 60—54.5)

This invention relates to power transmission devices, and more particularly to a mechanico-hydraulic power and control device of the type including liquid columns operated by a pair of cooperating rotary cams for cyclically shifting a driven machine element back and forth on a machine bed.

A mechanico-hydraulic motivator may be used to power and control automatic machinery of any type which includes one or more members which must be moved to and fro. One type of mechanico-hydraulic motivator which is readily adaptable to such machinery is the type deriving its basic motion from rotary cams. A plurality of cams rotated in unison each actuate an expansible chamber type transmitter, such as a pulsator piston reciprocated in a fixed cylinder by a cam follower. An expansible chamber type receiver, such as a double acting pulse responsive piston reciprocated in a cylinder, may be connected to a load device or driven element on the machine which is to be moved away from one limit stop defining a rest position and to another limit stop defining an advanced position, and then returned. A liquid column interconnecting the transmitter and the receiver to conduct motions therebetween may be confined in a rigid or a flexible conduit to provide utmost adaptability for modern complex production machinery. A combined replenishing and relief valve arrangement may connect each liquid column with a liquid reservoir to balance the volume of liquid in each closed motion transfer section of the motivator.

In the past, the driven element has been returned to its rest position limit stop by either of two systems. Generally a pressurized supply of liquid is employed to maintain a return force in the double acting receiver. When the driving cam presents a falling contour to the transmitter, the pressurized liquid causes the entire closed motion transfer section to follow the cam, and thus causes the driven element connected to the receiver to be moved back to its rest position with a desired motion accurately determined by the single falling cam face.

Another previously employed system makes use of a second cam powered and controlled liquid column type closed motion transfer device connected to the driven element in opposition to the first of such devices to provide the returning power. The two cams are designed with generally complementary contours so that one pushes while the other recedes and then the other does the powering while the first keeps out of the way.

Certain problems, however, have been encountered in both systems. In the pressurized return liquid arrangement there is inherent a definite weight limit to the load device which may be moved by a given section of the motivator. The cam operated transmitter is opposed not only by the inertia of the load device itself but by the comparatively high return force of the pressurized return liquid. Similarly, the only motive power available for returning a heavy load device to its rest position is the return force of the pressurized liquid.

In the prior double cam system, on the other hand, where one of the generally complementary cams leads or lags its mate by a small predetermined amount to avoid interference or where one contour may rise or fall with a slightly higher velocity than the other for the same reason, the system has the inherent power to move large load devices but has definite limitations on the speed with which the load devices may be shifted. A load device moved against some restraining force such as gravity, a work performing tool having sufficient arresting contact with a workpiece supported on the load device, or high inertia or frictional drag of the load device itself can be moved quickly and then slowed by such restraining force at the end of the stroke. But the ordinary load shifted rapidly against no appreciable restraining force outruns by its own momentum the powering cam and liquid column and thus slams into the limit stop in a highly unsatisfactory manner—and the greater the mass desired to be shifted by this more powerful double cam system, the worse the momentum problem.

Accordingly, it is an object of the present invention to provide in a mechanico-hydraulic motivator an arrangement whereby load devices far exceeding the weight which can be moved practically by a return liquid system may be successfully shifted to and fro at any desired rate and also carefully eased to a full stop at the end of the stroke by a pair of cooperating cam powered and controlled motion transfer devices.

Another object of the present invention is to provide in a mechanico-hydraulic motivator an arrangement for shifting to and fro a load device of such mass as could previously be successfully shifted only by a double cam type motivator and with deceleratory rate control as could previously be obtained positively only by a return liquid type motivator.

Another object of this invention is to provide a pair of cooperating non-complementary cams operating a pair of liquid column type motion transfer sections connected in opposition to a load device to both accelerate and then carefully decelerate the device in a given direction of translation between fully stopped positions.

A further object of this invention is to provide a pair of non-complementary cams operating a pair of liquid column type motion transfer sections connected in opposition to a load device to shift the device back and forth without the use of a continuously acting return force or bias.

A further object of this invention is to provide a liquid column type power and control unit in which the motivating unit works against the inertia of the load device plus the relatively low pressure of a refill reservoir and is not obliged to overcome the additional force of a more highly pressurized source of return liquid.

Further objects and advantages of the present invention will be apparent from the following detailed description, with reference to the accompanying drawings in which like reference characters refer to the same parts throughout the several views, and in which.

Figure 1:
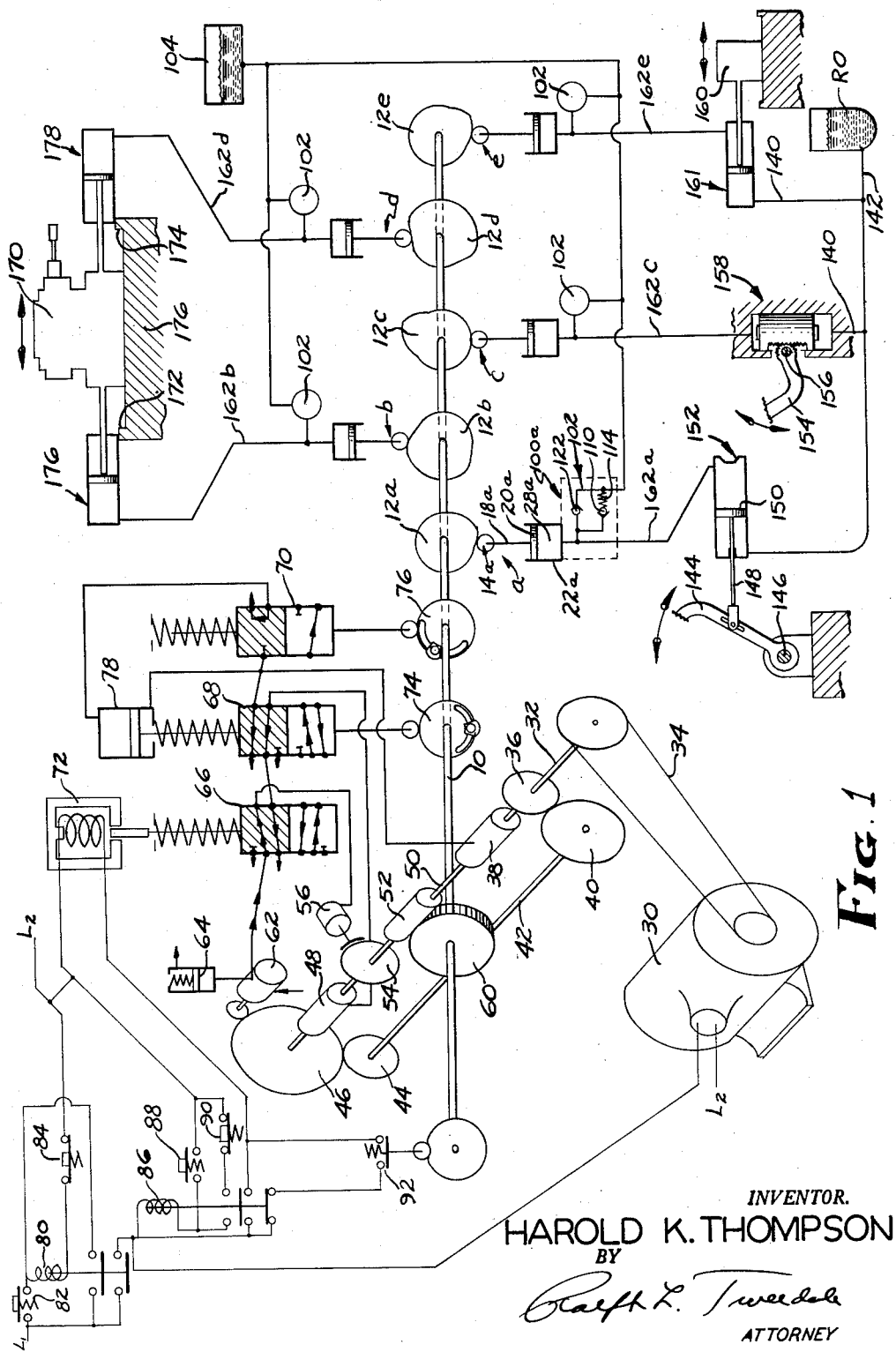
FIGURE 1 is a view in schematic fashion of a known mechanico-hydraulic power and control unit showing combined therewith a load device shifted by a pair of non-complementary cams according to this invention.
Figure 2:
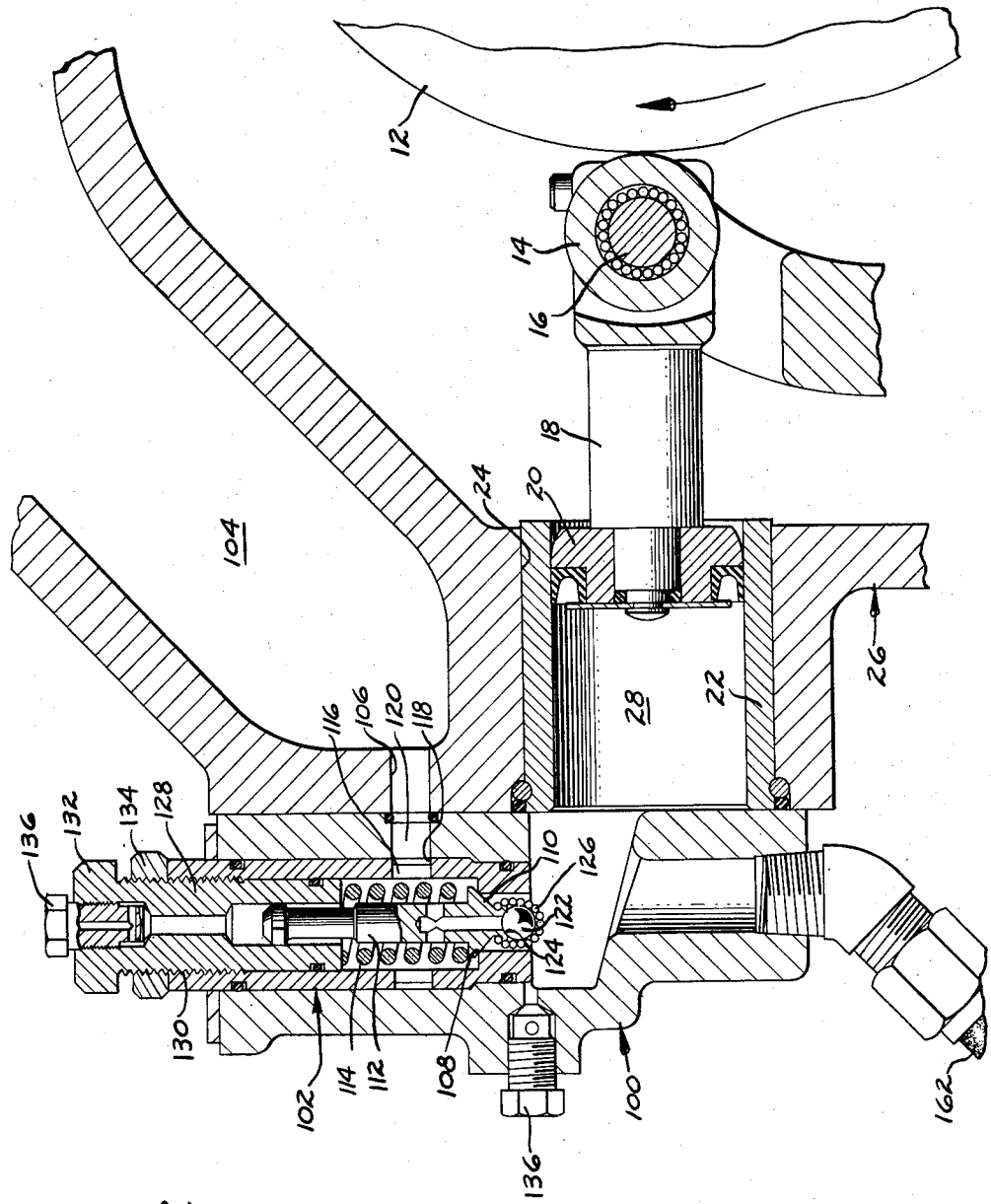
FIGURE 2 is a fragmentary sectional detail view showing an expansible chamber type transmitter, a portion of a liquid column, and a combined relief and replenishing valve interconnecting the liquid column and a liquid reservoir, all of a known variety.

In FIGURES 1 and 2, the basic elements of a rotary cam powered and controlled liquid column type motion transfer device are shown. Briefly, such a unit ordinarily comprises a main camshaft 10 having a plurality of rotary cams 12 keyed thereon, each cam having a contour composed of predetermined rise and fall ramps to produce a desired motion and impart it to a roller type cam follower 14 during each complete revolution or cycle of the cam. Each cam follower 14 is journalled at 16 in the end of the rod 18 of a pulsator piston 20 reciprocable within replaceable sleeve type cylinders 22 snugly received in suitable bores 24 of a cam housing 26. The main camshaft 10 may be journalled in the housing 26 so that motions imparted to the follower 14 by the cams 12 will move the pistons 20 to and fro in the cylinders 22 to vary the size of the cylinder chamber 28. The cam, cam follower, piston linked to the cam follower, cylinder, and variable volume chamber comprise a pulse transmitter of the expansible chamber type to which one end of a liquid column may be connected.

For turning the camshaft 10 a motor 30 drives an input shaft 32 of a two speed transmission through a belt drive 34. The input shaft 32 drives a pinion 36 and also the input member of a hydraulically-engaged, spring released clutch 38. Pinion 36 drives a gear 40 secured to a countershaft 42 which carries a pinion 44 at its opposite end. Pinion 44 drives a gear 46 and therewith constitutes a set of change speed gears. Gear 46 drives the input member of a second hydraulically-engaged, spring released clutch 48. The driven members of clutches 38 and 48 are secured to the opposite ends of a shaft 50 having a worm 52 thereon and a brake drum 54. The latter has a spring-biased hydraulic motor 56 for engaging the brake. Worm 52 drives a worm wheel 60 secured to the main camshaft 10.

For the purpose of automatically controlling the starting, stopping and speed of the transmission, there is provided a hydraulic control pump 62 driven from the gear 46 which may circulate a body of oil contained in the housing surrounding the transmission. The pump 62 may deliver to a combined accumulator and relief valve comprising a spring loaded piston 64 and also supplies oil to a bank of control valves 66, 68 and 70. In the diagrams each valve is shown as a two-position valve, spring biased to the position illustrated in which the connections shown in the cross hatched rectangles are established. Single headed arrows are used to indicate flow at reservoir pressure and double headed arrows to indicate flow at pump delivery pressure. Each of the valves, when shifted, establishes the connections shown in the unhatched rectangles immediately below the hatched rectangles.

Valve 66 is arranged to be shifted by a solenoid 72. Valves 68 and 70 are arranged to be shifted by adjustable cams 74 and 76, respectively, which are positioned on camshaft 10. In addition, the valve 68 has a hydraulic holding cylinder 78 which holds the valve 68 in its shifted position until it is released by the shifting of valve 70. Valve 66 in the position shown delivers pressure fluid to engage the brake 56 and also exhausts fluid to release the low speed clutch 48. When shifted, valve 66 exhausts fluid to release brake 66 and supplies pressure fluid to engage the low speed clutch 48, subject, however, to a conjoint control by the valve 68.

The latter valve, in the position illustrated, exhausts fluid to release the high speed clutch 38 and places the low speed clutch 48 under the control of valve 66. In its shifted position valve 68, provided valve 66 has been shifted, delivers pressure fluid to engage high speed clutch 38 and exhausts fluid to release low speed clutch 48. As previously explained, the valve 70 is merely a reset valve for by-passing the holding cylinder 78 to permit valve 68 to return to its spring biased position shown in the drawings.

Thus, energization of solenoid 72 will start the camshaft 10 rotating at low speed. Thereafter, the cam 74 will shift the transmission to drive the camshaft at high speed, and still later the cam 76 will again shift the transmission to slow speed. So long as the solenoid 72 remains energized, the camshaft 10 will continue to rotate, first at a slow speed and then at a high speed during each revolution, controlling its own speed changes by operation of the cams 74 and 76.

For the purpose of controlling the drive motor 30 and solenoid 72, there is provided an electric control circuit connected between a pair of electric supply lines designated L1 and L2. The circuit may include a master relay 80 of the holding type having a manual master start switch 82 and a manual master stop switch 84. Relay 80 controls the motor 30 and also a cycle control relay 86 of the holding type having a cycle start switch 88 and a manual cycle stop switch 90. The normally open contacts of relay 80, which are of the make-before-break type, control energization of cycle solenoid 72 directly. The normally closed contacts of relay 80 also control solenoid 72, but are in series with a cam switch 92 on the end of the camshaft 10 and arranged to be opened once during each revolution thereof. The arrangement is such that when the cycle stop switch 90 is operated at any point in the rotation of camshaft 10, relay 80 will be de-energized, but solenoid 72 will remain energized until cam switch 92 opens at the predetermined stopping point. Operation of the master stop switch 84, however, will de-energize solenoid 72 immediately, regardless of the point in the cycle and will also de-energize motor 30.

The cam shaft 10, as previously mentioned, drives a number of cam operated hydraulic pulsator sections designated $a$ through $e$, inclusive. Each section may comprise units duplicating the typical single acting pulsator unit above described in connection with FIGURE 2 and may be identified by corresponding reference numerals with the appropriate ones of the reference letters $a$ through $e$ appended thereto. The head 100 of the cylinder of each unit contains a balancing valve assembly 102 communicating between the pulsator moved liquid column and a liquid reservoir 104, which may be integral with the cam casing 26, by means of a port 106 in the casing.

The balancing valve assembly 102 may comprise a spring loaded pressure relief valve and a check ball type replenishing valve. A circular valve seat 108 is normally closed by the conical end 110 of a plunger 112 loaded by a compression spring 114 against the shoulder-formed circular seat 108. When pressure in the liquid column exceeds the force of the spring 114, liquid will flow between the surfaces 108, 110 in the known manner and escape to the reservoir by means of radial ports 116 communicating with an exterior annular groove 118 in the valve unit 102, and a port 120 in the cylinder head unit 100 adjacent the port 106 to the reservoir 104. Fluid from the reservoir will, through the same channels, at all times find access to a central cavity drilled interiorly of the plunger 112 and closed by a retaining ball 122 urged to a position against a beveled circular seat 124 by a light retaining spring 126. When pressure in the liquid column falls below that of the liquid in the reservoir 104, which is maintained under a low, super-atmospheric pressure by a head of air in the conventional manner, the ball 122 will come away from its seat 124 enough to allow liquid to pass, whereby the pressure in the liquid column will never drop below that of the reservoir for more than an instant.

An abutment member 128 threaded at 130 in the valve 102 serves to load the pressure relief spring 114 and may be adjusted by a suitable hex head 132, and secured in the adjusted position by a lock nut 134. Adjustment of the pressure load on the spring 114 determines at what pressure liquid will be diverted from the liquid column to the reservoir. Bleeder screws 136 located at high points in the system may be utilized to release trapped air. Thus, the combined relief and replenishing valve connected between the reservoir and the liquid column serve to discharge and re-deliver liquid from and to the column and thereby balance the volume of fluid in each of the sections of the mechanico-hydraulic motivator.

In order to insure proper synchronization of the driving and driven elements of each motion transfer section it is desirable to provide slightly more liquid displacement in the driving or transmitting elements than is present in the respective fluid motors (see below) at the opposite end of the liquid column line. The stroke and consequently the displacement of the fluid motors may be limited by suitable limit stops built into the motors or associated with the load devices. Thus, at the end of each advancing stroke of the transmitter piston 20, a small amount of liquid will be discharged to the reservoir 104 through the relief valve. This amount, plus any amount lost by leakage will be replenished to the liquid column at the end of the return stroke by operation of the replenishing valve 122.

In FIGURE 1, there are shown fluid lines 140 connected to the end of the expansible chamber type receiver motors opposite the liquid column connections. These lines communicate with a manifold line 142 containing fluid from a high pressure accumulator RO by means of which each of the individual motion transfer sections have previously been hydraulically biased to return the load devices to their rest positions and to maintain each follower 14 in close contact with its cam 12 as the falling portion of the cam contour recedes from the follower. The fluid in the accumulator RO may be pressurized by any known means that will provide a pressure adequate to return the load devices to their rest positions.

In the lower righthand portion of FIGURE 1 are several load devices to be moved which represent typical parts of a machine which are operated through a repeated sequence of motion. One such load device may comprise an arm 144 oscillatable about a pivot point 146 fixed on the machine by the piston rod 148 of the shiftable piston 150 of a fluid motor 152. Another load device may comprise a swinging arm 154 pivoted to the machine at 156 and reciprocated by a different type of shiftable rack piston fluid motor 158. Other familiar types of load devices represented by the block 160 may be moved to and fro on a guideway of the machine between suitable limit stops by means of the double acting hydraulic jack 161. All of the fluid motors 152, 158 and 161 with pulse responsive pistons represent expansible chamber type receivers.

Interconnecting the expansible chamber type receivers with the expansible chamber type transmitters, for the purpose of transferring motion from the cams to the load devices, are the previously mentioned liquid columns 162. The liquid columns may comprise any suitable hydraulic fluid confined by either rigid conduits or flexible piping to conduct a column or liquid link for to and fro motion between a transmitter and a receiver.

The pulsator section $a$ of the motivator is connected by its closed liquid column 162$a$ with the fluid motor 152 for oscillating the arm 144 in response to the cam 12$a$. Pulsator section $c$ is connected by its closed liquid column 162$c$ with the pulse receiving motor 158 for oscillating the arm 154 in response to the cam 12$c$. The transmitter section $e$ is connected by the closed liquid column 162$e$ with the expansible chamber type receiver motor 161 for shifting the load device 160 to and fro on the machine in response to the cam 12$e$ on the camshaft 10. Each of the load devices 144, 154 and 160 are returned to their rest positions by counteracting pressurized fluid from the source RO in the just described known manner.

In the upper righthand portion of FIGURE 1 is a load device 170 of greater than ordinary magnitude which is to be shifted rapidly to and fro between limit stops 172, 174 on the bed 176 of a machine. Such a load device may be so heavy that it could not be shifted back to its rest position limit stop 172 by the pressurized source RO of returning liquid, or its high inertia plus the relatively high biasing pressure from the source RO would total too great a force to be readily shifted by a cam powered and controlled liquid column type motion transfer section.

Connected between the machine and the load device 170 is a double acting expansible chamber type receiver means represented for purposes of clarity by an opposed pair of single acting fluid motors 176 and 178. In accordance with the principles of this invention, liquid column 162$b$ may interconnect the motor 176 and the pulsator section $b$ to provide power for biasing the load device in the direction of the limit stop 174. Fluid motor 178, on the other hand, may be connected by a liquid column 162$d$ with the pulse transmitting section $d$, powered and controlled by the cam 12$d$ on the camshaft 10, for shifting the load device 170 back toward the limit stop 172.

With the cams 12$b$ and 12$d$ designed in complementary or substantially complementary fashion according to the prior practice, the load device 170 could be shifted toward limit stop 174 by the cam 12$b$ and moved back toward stop 172 by the cam 12$d$. However, without an inherent frictional, gravitational or other restraining force to govern the movement of the load device 170, the load device of its own momentum would outrun the powering cam near the end of its stroke and strike the limit stop with great force in a highly undesirable manner. The non-complementary cam design of this invention, however, overcomes such impractical aspects of the prior design.

Figure 3:
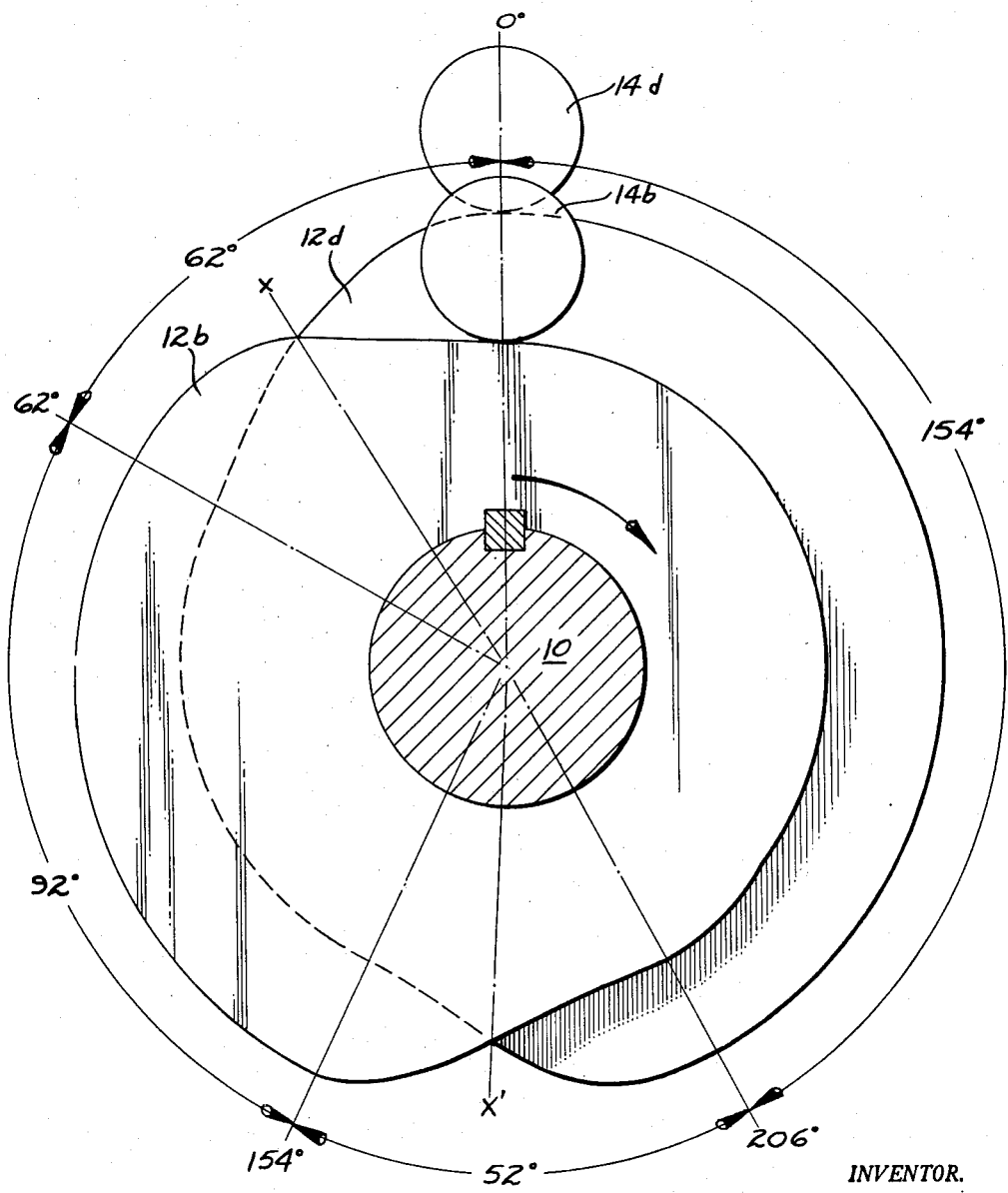
FIGURE 3 is a view of a pair of non-complementary cams such as may be utilized by this invention.
Figure 4:
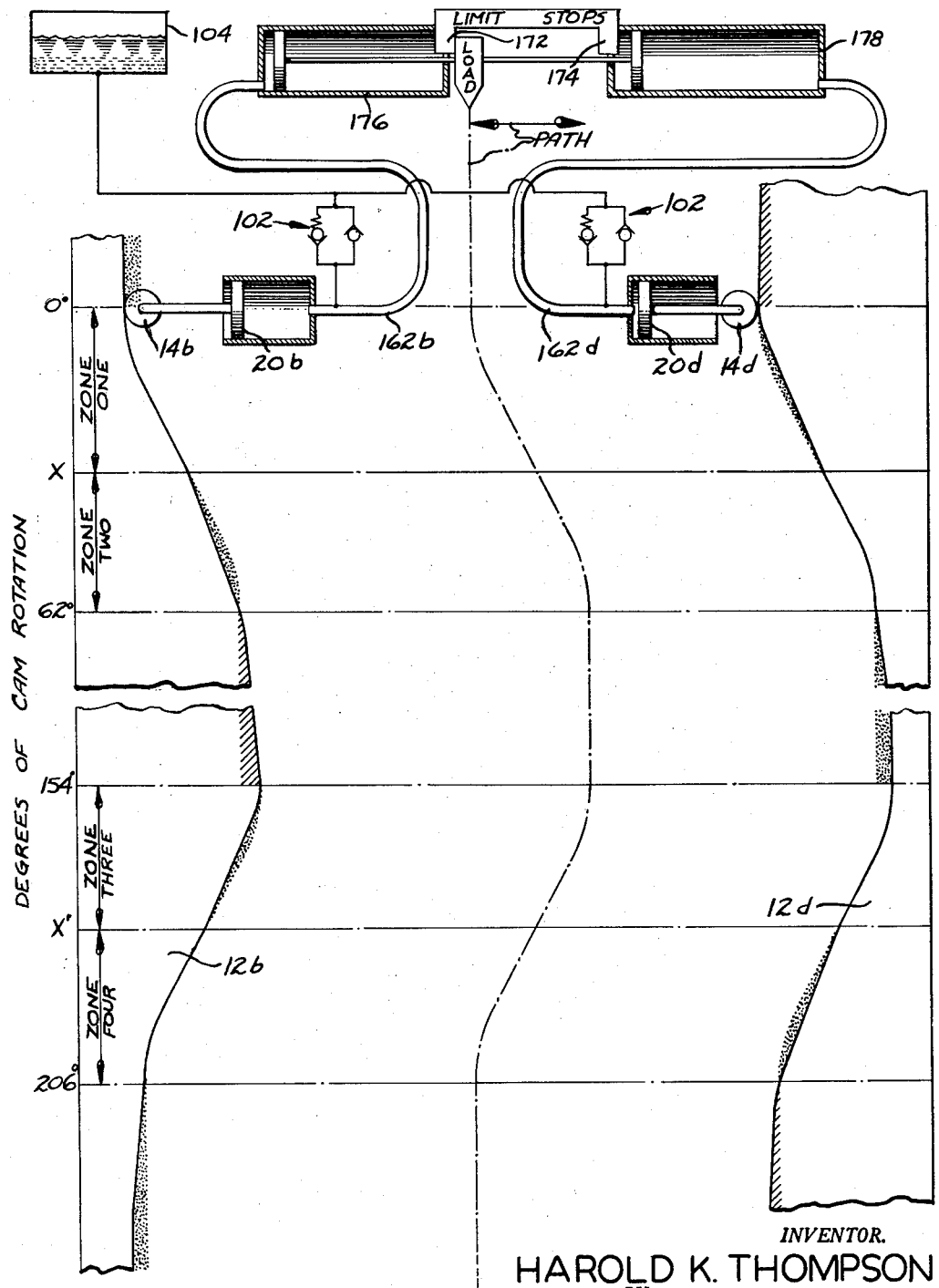
FIGURE 4 is a schematic view of two opposed liquid column type motion transfer units combined with a developed view of the contours on a pair of cooperating cams.

The cooperating non-complementary pair of cams 12$b$ and 12$d$ of this invention are best visualized with reference to FIGURES 3 and 4. In FIGURE 3, a pair of cams 12$b$ and 12$d$ as they would actually appear on the camshaft 10 is shown with corresponding followers 14$b$ and 14$d$ represented simply by circles in the upper portion of the figure. In FIGURE 4, the contours of the cams 12$b$ and 12$d$ are represented in somewhat exaggerated developed or unrolled fashion to facilitate understanding of the manner in which the non-complementary ramps cooperate with one another to effectively shift the load device. Also, in FIGURE 4, an exemplary load device and its double acting pulse receiving means, such as motors 176 and 178, are schematically shown on a different scale connected with the liquid column motion transmitting sections which are powered and controlled by the two cams.

To move a heavy load device away from its rest position limit stop 172 with a desired acceleration and speed and then slow its forward motion prior to contact with the advance position limit stop 174, and then similarly return, the cam contours may best be understood by dividing them into four motion imparting zones to obtain a typical cycle of motions illustrated by the dash-dot line developed down the center of FIGURE 4 between the opposing cam ramps. The first zone and second zone together control movement of the load device to the right (through 62 degrees of cam rotation), and the third and fourth zones together control movement of the load device back to the left (through 52 degrees of cam rotation). The remaining peripheral extent of the pair of cam ramps constitute zones which do not impart motion to the load device but merely act to hold it against the limit stop. The first motion imparting zone begins at 0 degrees of cam revolution (see FIGURES 3 and 4) and continues until the load device has been accelerated and moved in the desired fashion. This zone consists of a rising ramp on the cam 12$b$ between 0 degrees and the line marked $x$. The corresponding portion of the first motion imparting zone of the cooperating contours on cam 12$d$ is a falling ramp which initially falls at a greater rate than the rise on the cam 12$b$ to avoid interfering motion. This allows liquid from the reservoir 104 to be added to the liquid column 162$d$ as suggested by the stippled area which also indicates the amount the cam 12$d$ actually deviates from the true path of the load represented by the dash-dot line down the center of FIGURE 4. Thus, the cam 12$b$ alone powers and controls the accelerating and moving of the load in this zone.

Zone two begins at the line $x$ and continues until the load has reached the advanced position limit stop 174 which is desired to be accomplished, for instance, when the cams have rotated through 62 degrees of a revolution. This zone consists of a falling ramp on the cam 12d which initially falls at the same rate the load device is moving as it leaves the rising ramp of cam 12b. As the load approaches the advance position limit stop 174, the falling contour on cam 12d levels off to impart deceleratory motion to the load in the desired manner. The corresponding portion of cam 12b continues to rise, but at a slower rate, so that it will be of no positive motive effect on the load which thus allows liquid from the low pressure reservoir 104 to be replenished to the liquid column 162b (note stippled area). As the falling face of cam 12d levels off near the 62 degree mark in its approach to its base circle, the load device will be braked by the interconnecting liquid column 162d, and the load will be eased in the desired manner against the limit stop 174.

For several degrees of cam rotation after the load is against the advanced position limit stop 174, the contour of cam 12d may continue to fall at a very slight rate to insure that it will not exert any influence on the load while it is against the limit stop 174; after this few degrees of slight descent, the cam contour may level off at its base circle until the point in cam revolution, such for example as at 154 degrees, when it is desired that the load device begin its return motion. Correspondingly, a slowly rising contour on cam 12b begins at the 62 degree point to exert pressure once again on the load device and securely hold it against the limit stop 174 (through 92 degrees of cam rotation) to prevent any bouncing or drifting away during the time that the load is to remain in the advanced position. During this time, when the load is stopped and cam 12b is still slowly rising, liquid will be relieved through the balancing valve 102 from the liquid column 162b to the low pressure reservoir 104, as represented by the cross-hatched area on the cam 12b in FIGURE 4 which also indicates the amount by which the cam contour may deviate from the true path of the load.

The cam contours in zones three and four may consist functionally of substantial mirror images of zones one and two. Zone three, beginning at the 154 degree position, may encompass a rise on cam 12d which will accelerate and move the load device away from the limit stop 174, the predetermined rise continuing to the line x', while the corresponding portion of cam 12b falls at an initially greater rate to avoid interfering motion and allow liquid to be replenished to the liquid column 162b. Similarly, at the return stroke crossover point x' the fourth zone may begin. It may consist of a predetermined fall contour on cam 12b to decelerate the load device and ease it against the rest position limit stop 172, while the corresponding portion of the contour of cam 12d continues to rise at a somewhat slower rate to avoid interfering motion and allow liquid column refill from the reservoir.

As the load approaches its rest position limit stop 172, the contour on the cam 12b may approach its flattened or base circle portion for a few degrees beyond the 206 degree point where the load is to actually contact the limit stop, an easement which permits small adjustments of the limit stops to vary the stroke of the load. This time, cam 12d will continue to present a gradually rising contour to the follower 14d from the 206 degree point where the load contacts the rest position limit stop throughout the remainder of the 360 degrees of cam rotation while the load is to be held motionless against this limit stop.

In other words, operation of fluid motor 176 in response to the rise on cam 12b between 0 degrees and the x point moves the load away from the rest position limit stop 172 and accelerates and moves it toward the limit stop 174. At the x point the falling contour on cam 12d takes over and compels fluid motor 178 to decelerate the load and ease it against the advanced position limit stop. The load is then held securely against the advanced position limit stop 174 by the slow rise between 62 degrees and 154 degrees on the cam 12b, the presure with which the load is held being determined by the force with which pressure relief spring 114 urges the plunger 110 against the seat 108 in the balancing valve assembly. On return motion, the cam 12d initially rises and moves the load away from the stop 174 and accelerates it back toward the limit stop 172 from 154 degrees to the x point, at which time the falling contour on cam 12b takes over and eases the load to a stop against the rest position limit stop 172 where it is securely held by the continual slight rise between 206 degrees and 360 degrees on the cam 12d. It will of course be understood that the particular motion or cycle including degrees and rates of rise or fall that has just been described is to be taken purely by way of example only, and that other desired arrangements may be designed within this invention.

Thus, a double rotary cam powered and controlled liquid column type motion transfer device is provided which may shift a heavy load device to and fro on a machine at any desired speed with complete control during both acceleratory and deceleratory motion. The pair of cooperating cams which produce this motion have strictly non-complementary contours which cooperate in a manner which permits only one cam at a time to have any positively motive effect upon the load device. The counteracting cam, when it is not imparting positive motion to the load device during the load shifting portion of the cycle, presents a contour to its follower which is of a somewhat different degree than the corresponding motion imparting contour of the powering cam so that liquid will be replenished to its liquid column from the low pressure reservoir, thus assuring that the only force in addition to the load inertia which the motion imparting cam must overcome is that of the low pressure reservoir. Also, this portion of each cam's contour, which does not move the load, adjacent the FIGURE 4 stippled areas, greatly reduces the precision with which the cams need be designed because these ramps have merely to avoid interfering motion in a non-critical manner allowing wide tolerances. Provision has also been made for insuring that the load is securely held against its limit stop at either extent of shifting with an adjustable force sufficient to prohibit any bouncing or drifting of the load away from the limit stop as it is held during the work performing portion of the machine cycle. Furthermore, positive cam power is provided in both directions of shifting, each of which may be traversed in a second or less, and the magnitude of the load device is not limited by the pressure available from the standard pressurized return liquid system. Finally, the virtually unlimited varieties of motion that may be attained by particular designs of the cams renders this invention applicable to a wide range of machine motivation problems.

As suggested in FIGURE 1, the non-complementary pair of cooperating cams of this invention may readily be incorporated with a standard mechanico-hydraulic motivator which relays upon pressurized return liquid to provide the counter bias for some of the load devices on the machine. Or all the load devices on a given machine may be powered and controlled by pairs of cooperating cams, and the return oil system may be eliminated entirely. Additionally, either a single speed or the transmission controlled rapid and feed speed camshaft may be utilized with either of these combinations as the machine program dictates, with cams designed accordingly.

While the above described embodiment constitutes a preferred mode of carrying out this invention, many other forms might be adopted within the scope of the actual invention, which is variously claimed as:

A mechanico-hydraulic power transmission device for intermittently shifting a driven element to and fro comprising double acting expansible chamber type receiver means connected to shift the element, abutment means for positively limiting movement of the element, a pair of opposing expansible chamber type transmitters each connected by a liquid column to one side of the receiver means to move the driven element and hold it against the abutment means, reservoir means for liquid, replenishing and pressure relief valves interconnecting each liquid column with the reservoir means, a mechanical power and control unit connected to continually actuate both transmitters to periodically move the element to and fro and periodically hold it against the abutment means, acceleratory motion away from the abutment means and deceleratory motion back against the abutment means adjacent one end of the path of the element being governed solely by one transmitter and acceleratory motion away from and deceleratory motion back against the abutment means adjacent the other end of the path being governed solely by the other transmitter, liquid being replenished from the reservoir means to whichever liquid column is not tending to produce either acceleratory or deceleratory motion of the element and liquid being relieved to the reservoir means from one liquid column whenever the driven element is held against the abutment means, and means for driving the mechanical power and control unit.

References Cited in the file of this patent

UNITED STATES PATENTS

| | | |
|---|---|---|
| 1,939,851 | Horste | Dec. 19, 1933 |
| 2,414,519 | Greene | Jan. 21, 1947 |
| 2,437,821 | Hughes | Mar. 16, 1948 |
| 2,759,366 | Reid | Aug. 21, 1956 |
| 2,766,590 | Erwin et al. | Oct. 16, 1956 |
| 2,882,685 | Carlsen et al. | Apr. 21, 1959 |
| 2,915,016 | Weaver et al. | Dec. 1, 1959 |
| 2,916,921 | Henshaw | Dec. 15, 1959 |
| 2,978,044 | Baines | Apr. 4, 1961 |
| 2,997,849 | Shimanckas | Aug. 29, 1961 |